(12) United States Patent
Eyama

(10) Patent No.: US 10,706,313 B2
(45) Date of Patent: Jul. 7, 2020

(54) IMAGE PROCESSING APPARATUS, IMAGE PROCESSING METHOD AND IMAGE PROCESSING PROGRAM

(71) Applicant: KONICA MINOLTA, INC., Chiyoda-ku (JP)

(72) Inventor: Tamaki Eyama, Nerima-ku (JP)

(73) Assignee: Konica Minolta, Inc., Tokyo (JP)

( * ) Notice: Subject to any disclaimer, the term of this patent is extended or adjusted under 35 U.S.C. 154(b) by 126 days.

(21) Appl. No.: 16/027,727

(22) Filed: Jul. 5, 2018

(65) Prior Publication Data

US 2019/0012556 A1    Jan. 10, 2019

(30) Foreign Application Priority Data

Jul. 10, 2017    (JP) .................................. 2017-134709

(51) Int. Cl.
*G06K 9/00*    (2006.01)
*G06K 9/32*    (2006.01)
(Continued)

(52) U.S. Cl.
CPC ....... *G06K 9/3241* (2013.01); *G06K 9/00771* (2013.01); *G06K 9/4604* (2013.01);
(Continued)

(58) Field of Classification Search
CPC ............... G06K 9/3241; G06K 9/4604; G06K 9/00771; G06K 9/6857; G06T 7/73;
(Continued)

(56) References Cited

U.S. PATENT DOCUMENTS

2009/0010521 A1* 1/2009 Ramsay ............... G06K 9/3241
382/141
2013/0195359 A1* 8/2013 Yabu .................... H04N 1/3876
382/171

(Continued)

FOREIGN PATENT DOCUMENTS

JP    2007-226643    9/2007

OTHER PUBLICATIONS

A. Toshev et al., "DeepPose: Human Pose Estimation via Deep Neural Networks", in CVPR, 2014, http://www.cv-foundation.org/openaccess/content_cvpr_2014/papers/Toshev_DeepPose_Human_Pose_2014_CVPR_paper.pdf.

(Continued)

*Primary Examiner* — Charles T Shedrick
(74) *Attorney, Agent, or Firm* — Cozen O'Connor

(57) ABSTRACT

An image processing apparatus includes: an image acquisition part that obtains an image including a captured target object; a first recognition part that extracts a feature related to the target object in the image and discriminates a category related to the target object based on a result of the feature extraction; a reliability acquisition part that obtains reliability of a discrimination result of the first recognition part with reference to data indicating reliability of the discrimination result stored in association with a candidate category classified by the first recognition part; a second recognition part that executes discrimination processing in accordance with the discrimination result of the first recognition part, extracts a feature related to the target object in the image, and discriminates the category related to the target object based on the result of the feature extraction and the reliability of the discrimination result of the first recognition part.

7 Claims, 6 Drawing Sheets

(51) Int. Cl.
    *G06K 9/46*     (2006.01)
    *G06T 7/73*     (2017.01)
    *G06T 7/12*     (2017.01)
    *G06K 9/68*     (2006.01)
    *G06T 7/77*     (2017.01)

(52) U.S. Cl.
    CPC .............. *G06K 9/6857* (2013.01); *G06T 7/12* (2017.01); *G06T 7/73* (2017.01); *G06T 7/77* (2017.01); *G06T 2207/10012* (2013.01); *G06T 2207/10048* (2013.01); *G06T 2207/20076* (2013.01); *G06T 2207/30196* (2013.01)

(58) Field of Classification Search
    CPC . G06T 2207/10012; G06T 2207/10048; G06T 2207/20076; G06T 2207/30196; G06T 7/12; G06T 7/77
    See application file for complete search history.

(56) References Cited

U.S. PATENT DOCUMENTS

| | | | |
|---|---|---|---|
| 2013/0243246 A1* | 9/2013 | Lao ..................... | G06K 9/00255 382/103 |
| 2016/0012297 A1* | 1/2016 | Kanga ................ | G06K 9/00771 382/103 |
| 2016/0071285 A1* | 3/2016 | Shibata .............. | G06K 9/00261 382/103 |
| 2018/0173973 A1* | 6/2018 | Hattori ................... | G06K 9/629 |
| 2018/0268237 A1* | 9/2018 | Stanimirovic ....... | G06K 9/2018 |
| 2019/0370533 A1* | 12/2019 | Han ................... | G06K 9/00248 |

OTHER PUBLICATIONS

Donald O. Tanguay, Jr. et al. "Hidden Markov Model for Gesture Recognition", Carnegie Mellon University, Technique Report, 1994, ("URL: https://pdfs.semanticscholar.org/c66a/6ae713efb2730e28d090710ffeeb77e883f7.pdf").

* cited by examiner

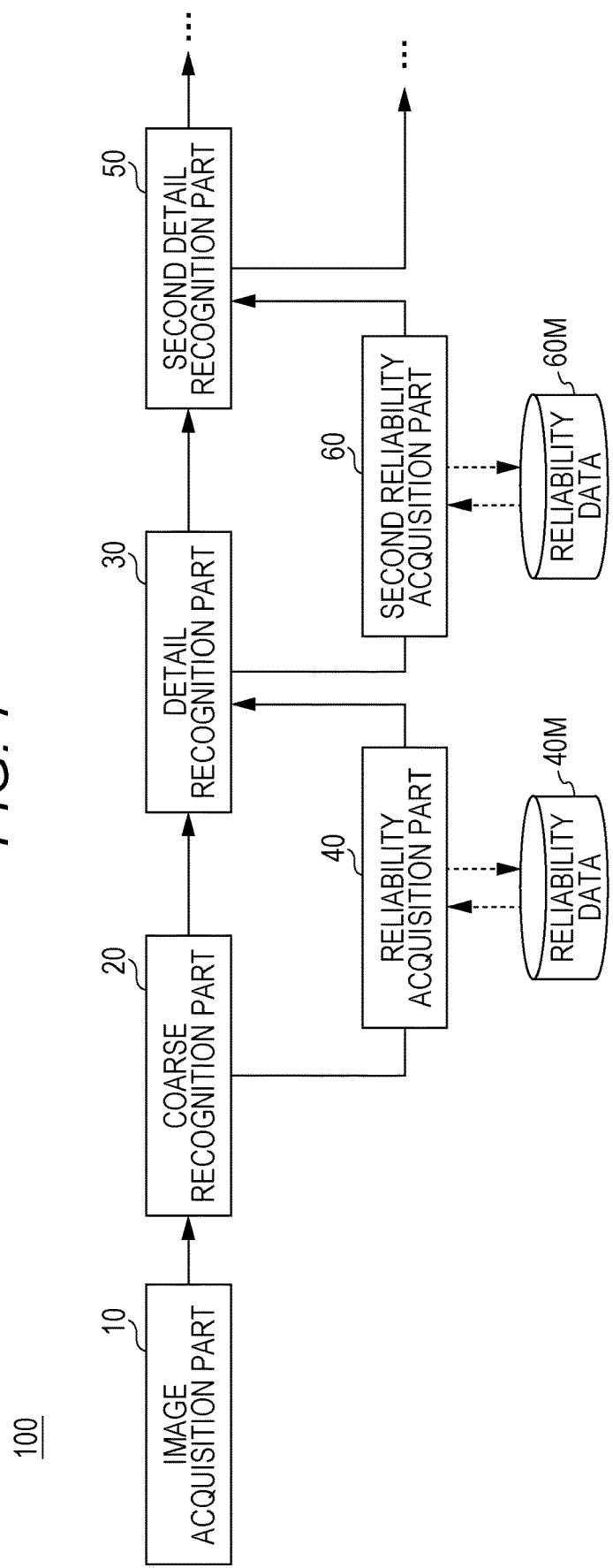

IMAGE PROCESSING APPARATUS, IMAGE PROCESSING METHOD AND IMAGE PROCESSING PROGRAM

The entire disclosure of Japanese patent Application No. 2017-134709, filed on Jul. 10, 2017, is incorporated herein by reference in its entirety.

BACKGROUND

Technological Field

The present disclosure relates to an image processing apparatus, an image processing method, and an image processing program.

Description of the Related Art

As a conventional technique in an image processing apparatus, there is a known technique of first detecting a region in which a recognition target object exists to narrow down the region, then performing image analysis in more detail, that is, a technique of performing discrimination of a category or the like of the recognition target object in stages.

For example, JP 2007-226643 A discloses a technique of first performing recognition of a coarse recognition processing phase by extracting a global feature value from a coarse resolution image in order to narrow down the recognition target, and then, performing more detailed recognition processing using higher resolution on the candidates narrowed down by the coarse recognition processing.

Meanwhile, there is a demand in recent years for further enhancement in accuracy in image recognition systems. In this respect, the conventional technology such as in JP 2007-226643 A is capable of executing recognition processing in stages, leading to expectation of a certain level of accuracy enhancement.

Such an image recognition system according to the conventional technology, however, performs recognition processing separately in individual recognition phases, and thus has a room for enhancement in terms of optimization of the entire image recognition system and accuracy enhancement. In addition, the image recognition system according to the conventional technology has a problem that recognition results depend solely on learning performed on a classifier, leaving no room for user's adjustment.

SUMMARY

The present disclosure has been made in view of the above problems, and an object of the present disclosure is to provide an image processing apparatus, an image processing method, and an image processing program capable of performing image recognition with higher accuracy.

To achieve the abovementioned object, according to an aspect of the present invention, an image processing apparatus reflecting one aspect of the present invention comprises an image acquisition part that obtains an image including a captured target object; a first recognition part that extracts a feature related to the target object in the image and discriminates a category related to the target object on the basis of a result of the feature extraction; a reliability acquisition part that obtains reliability of a discrimination result of the first recognition part with reference to data indicating reliability of the discrimination result stored in association with a candidate category classified by the first recognition part; a second recognition part that executes discrimination processing in accordance with the discrimination result of the first recognition part, extracts a feature related to the target object in the image, and discriminates the category related to the target object on the basis of the result of the feature extraction and the reliability of the discrimination result of the first recognition part.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a diagram illustrating specific processing executed by individual configurations of an image processing apparatus according to a second modification.

DETAILED DESCRIPTION OF EMBODIMENTS

Figure 1:
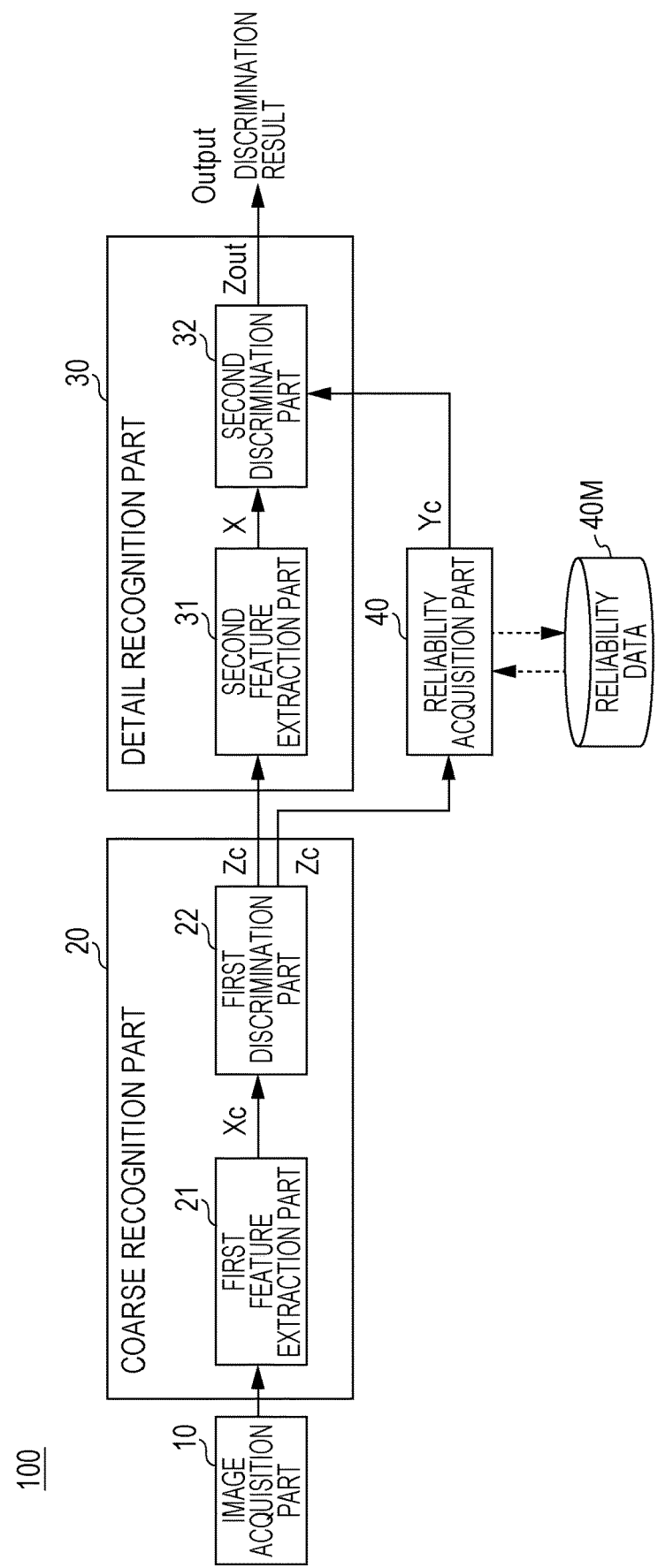
FIG. 1 is a diagram illustrating an exemplary functional configuration of an image processing apparatus according to an embodiment.

Hereinafter, one or more preferred embodiments of the present disclosure will be described in detail with reference to the drawings. However, the scope of the invention is not limited to the disclosed embodiments. Note that in this specification and the drawings, the same reference numerals are given to constituent elements having substantially the same functional configuration, and redundant description will be omitted.

[Outline of Configuration of Image Processing Apparatus]

FIG. 1 is a diagram illustrating an exemplary functional configuration of an image processing apparatus 100 according to an embodiment. Arrows in FIG. 1 indicate flows of processing of individual functions and flows of data.

The image processing apparatus 100 according to the present embodiment performs predetermined calculation processing on an image to discriminate a category (hereinafter referred to as "category related to the target object") related to a predetermined object appearing in the image, and outputs a discrimination result.

The "category related to the target object" may be applied to any category such as a category of the object type to which the target object belongs, a category of the posture of the target object, or a category of the movement of the target object.

The image processing apparatus 100 according to the present embodiment includes an image acquisition part 10, a coarse recognition part 20, a detail recognition part 30, and a reliability acquisition part 40.

The image acquisition part 10 obtains image data generated by an imaging apparatus.

The coarse recognition part 20 (corresponding to a "first recognition part" of the present invention) obtains image data from the image acquisition part 10 and performs relatively coarse feature extraction processing or discrimination processing so as to generally recognize a category related to the target object and an existence region within the image.

The coarse recognition part 20 extracts a feature related to the target object in the image, and discriminates a category Zc (hereinafter also referred to as a "first discrimination result Zc") related to the target object on the basis of a result Xc of the feature extraction (hereinafter also referred to as a "first feature extraction result Xc").

The reliability acquisition part 40 obtains reliability Yc of the first discrimination result Zc with reference to reliability data 40M set for at least one of candidate categories classified by the coarse recognition part 20. The reliability Yc of the first discrimination result Zc is an indicator of the probability that the category indicated by the first discrimination result Zc is true.

The detail recognition part 30 (corresponding to a "second recognition part" of the present invention) obtains image data, data of the first discrimination result Zc, or the like, from the coarse recognition part 20. Subsequently, in accordance with the first discrimination result Zc, the detail recognition part 30 determines a processing mode of the discrimination processing so as to narrow down the candidate categories for classifying the categories related to the target object, and discriminates the category related to the target object in the determined processing mode.

Subsequently, the detail recognition part 30 performs relatively highly detailed and highly accurate feature extraction processing on the image data, and extracts a feature X (hereinafter also referred to as a "second feature extraction result X") related to the target object in the image. Subsequently, on the basis of the second feature extraction result X and the reliability Yc of the first discrimination result Zc, the detail recognition part 30 discriminates the category related to the target object (hereinafter referred to as a "second discrimination result Zout") by relatively highly detailed and highly accurate discrimination processing, and outputs the discrimination result Zout as a final calculation result.

In this manner, the image processing apparatus 100 according to the present embodiment separates the recognition processing into two stages to achieve highly accurate recognition while reducing the processing load.

In addition, the image processing apparatus 100 according to the present embodiment refers to the reliability Yc of the first discrimination result Zc in performing the discrimination processing of the detail recognition part 30, so as to further achieve higher discrimination accuracy of the second discrimination result Z.

Specifically, a classifier usually has a certain degree of error probability, and general image processing might have higher discrimination accuracy in some cases depending on the discrimination target. In other words, the discrimination accuracy of the coarse recognition part 20 might sometimes be higher than the discrimination accuracy of the detail recognition part 30 depending on the discrimination target.

From such a viewpoint, the image processing apparatus 100 according to the present embodiment obtains beforehand the reliability Yc for each of the candidate categories classified by the coarse recognition part 20, and in a case where the first discrimination result Zc has a high reliability Yc, correction is performed to increase an evaluation value of the candidate category corresponding to the first discrimination result Zc at the time of the discrimination processing by the detail recognition part 30, so as to allow the candidate category to be likely to be selected.

Figure 2:
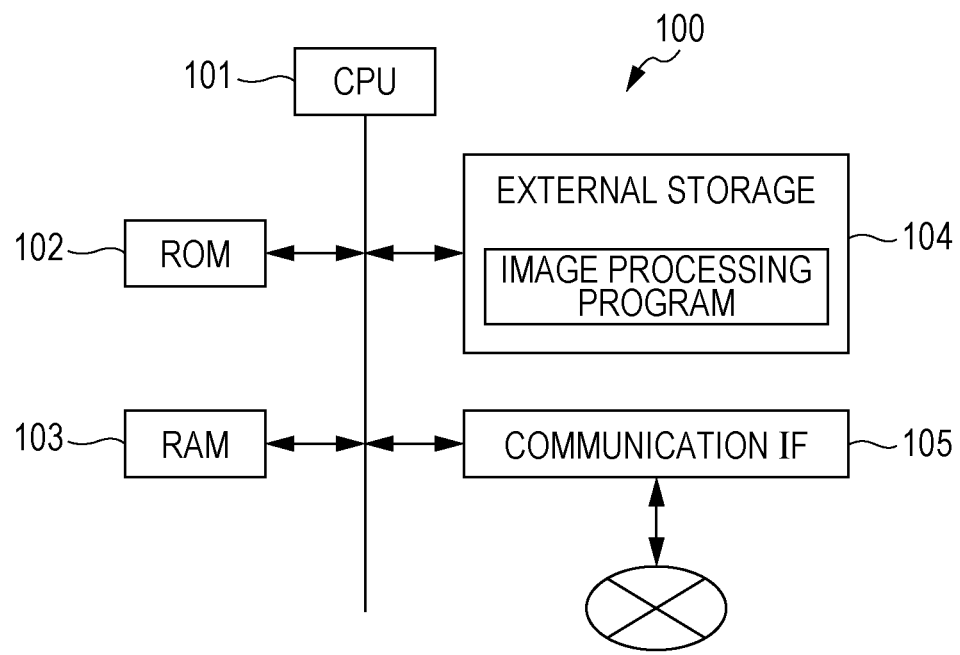
FIG. 2 is a diagram illustrating an exemplary hardware configuration of an image processing apparatus according to an embodiment.

FIG. 2 is a diagram illustrating an exemplary hardware configuration the image processing apparatus 100 according to the present embodiment.

The image processing apparatus 100 is a computer that includes, as main components, a central processing unit (CPU) 101, a read only memory (ROM) 102, a random access memory (RAM) 103, an external storage (for example, a flash memory) 104, and a communication interface 105.

For example, the above-described functions of the image processing apparatus 100 are implemented by the CPU 101 with reference to a control program (for example, an image processing program) and various data (for example, model data of the classifier) stored in the ROM 102, the RAM 103, the external storage 104, or the like.

Alternatively, however, part or all of individual functions may be implemented by processing by a digital signal processor (DSP) instead of or together with the processing by the CPU. Similarly, part or all of individual functions may be implemented by processing by a dedicated hardware circuit instead of or together with processing by software.

Individual configurations of the image processing apparatus 100 according to the present embodiment will be described in detail below.

[Image Acquisition Part]

The image acquisition part 10 obtains image data including a captured target object as a recognition target.

For example, the image acquisition part 10 obtains image data of an image in which a human, animal, furniture, or the like appears as a "target object".

The image data obtained by the image acquisition part 10 is image data generated by a certain imaging apparatus such as an ordinary camera, a wide angle camera, a stereo camera, and an infrared camera. The image acquisition part 10 may obtain image data of a still image, or may obtain image data of a moving image continuously generated by the imaging apparatus.

The image acquisition part 10 may obtain image data from the imaging apparatus or obtain image data stored in the external storage 104 or image data provided via an Internet line.

[Coarse Recognition Part]

The coarse recognition part 20 includes a first feature extraction part 21 and a first discrimination part 22.

The first feature extraction part 21 obtains image data from the image acquisition part 10, performs relatively coarse feature extraction processing on the image, and extracts a feature related to the target object in the image. The first feature extraction result Xc is represented by a multidimensional feature vector, for example.

Example of techniques of extracting a feature related to a target object by the first feature extraction part 21 include silhouette extraction processing, learned CNN processing, and Histograms of Oriented Gradients (HOG) feature value extraction processing. Alternatively, the first feature extraction part 21 may be configured by combining a plurality of types of feature extraction processing, or may be configured in combination with preprocessing parts for region division processing or color division processing.

The first discrimination part 22 obtains data of the first feature extraction result Xc from the first feature extraction part 21 and calculates an evaluation value (for example, a posterior probability) for each of candidate categories for classifying the categories related to the target objects, for example, and discriminates the candidate category having the greatest evaluation value as the category Zc related to the target object.

The candidate categories for which the first discrimination part 22 classifies categories related to the target object are part of or identical to the candidate categories for classifying the categories related to the target object by the second discrimination part 32. It would be, however, more preferable that the number of candidate categories of the second discrimination part 32 be larger than the number of candidate categories of the first discrimination part 22, and that candidates be selectively narrowed down before recognition processing on the basis of the first discrimination result Zc.

Note that it is preferable that the coarse recognition part 20 transmit to the detail recognition part 30 also data for setting modes of feature extraction processing and the discrimination processing in the detail recognition part 30, such as the region where the target object is detected, in addition to the data of the category Zc related to the target object.

Examples of the techniques used by the first discrimination part 22 to perform discrimination processing include a rule-based classifier using template matching, or the like, a learned Bayesian classifier, a learned support vector machines (SVM) classifier, a learned convolutional neural network, or learned hidden Markov model. Alternatively, the first discrimination part 22 may be configured by combining a plurality of types of classifiers, or may be configured in combination with preprocessing parts for region division processing or color division processing.

[Reliability Acquisition Part]

The reliability acquisition part 40 obtains data of the first discrimination result Zc from the first discrimination part 22. Subsequently, the reliability acquisition part 40 refers to the reliability data 40M of the discrimination result stored in association with each of candidate categories classified by the first discrimination part 22 to obtain the reliability Yc of the corresponding first discrimination result Zc, and transmits the obtained reliability Yc to the second discrimination part 32 of the detail recognition part 30.

The "reliability of the first discrimination result" is an indicator of the probability that the category indicated by the first discrimination result is true.

For example, the reliability of the first discrimination result is obtained beforehand by experiments or the like for each of the candidate categories classified by the first discrimination part 22 as illustrated in the following formula (1). Subsequently, the reliability is stored as the reliability data 40M in a storage such as the ROM 102 in association with the candidate category.

[Mathematical Expression 1]

$$\text{Reliability} = \frac{TP}{TP + FP} \quad \text{Formula (1)}$$

(where, TP represents True-Positive (the number of times of cases where the first discrimination result is in a correct category), and FP represents False-Positive (the number of time of cases where the first discrimination result is in an incorrect category)

The above calculation formula (1), however, is an example for setting the reliability Yc and thus can be variously changed. Moreover, the reliability data 40M is more preferably configured to allow any setting change by the user.

It is desirable to obtain the reliability data 40M for all the candidate categories classified by the first discrimination part 22. Still, in cases where the number of categories is two categories or the like, the reliability on one side can be used to obtain the reliability of the category on the other side.

[Detail Recognition Part]

The detail recognition part 30 includes a second feature extraction part 31 and a second discrimination part 32.

The detail recognition part 30 first selects a candidate category for discriminating a category related to the target object on the basis of the discrimination result Zc of the coarse recognition part 20 and then determines discrimination processing suitable for judgment of propriety of the candidate category. For example, the second discrimination part 32 may perform discrimination processing by narrowing down the number of candidate categories beforehand in accordance with the first discrimination result Zc. In addition, the second feature extraction part 31 may determine a feature extraction technique and a feature extraction region suitable for discriminating a specific candidate category in accordance with the first discrimination result Zc.

The second feature extraction part 31 obtains data of the first discrimination result Zc and image data from the first discrimination part 22. Subsequently, the second feature extraction part 31 performs a relatively highly detailed feature extraction processing on the image, and extracts the feature X (hereinafter also referred to as a "second feature extraction result X") of the target object in the image.

The second discrimination part 32 obtains data of the reliability Yc of the first discrimination result Zc from the reliability acquisition part 40 as well as obtaining data of the second feature extraction result X from the second feature extraction part 31, and discriminates the category Zout related to the target object on the basis of these pieces of data.

As a technique of feature extraction performed by the second feature extraction part 31, it is possible to use various techniques similarly to the case of the first feature extraction part 21. As a technique of discrimination processing performed by the second discrimination part 32, it is possible to use various techniques similarly to the case of the first discrimination part 22. Still, it would be more preferable to use a configuration in which the second feature extraction part 31 performs feature extraction in an image region narrower than the first feature extraction part 21, and performs feature extraction of more feature elements than the first feature extraction part 21. Moreover, it would be more preferable to use a configuration in which the second discrimination part 32 can discriminate small feature differences, or can perform discrimination processing on more feature elements, compare with the first discrimination part 22.

Now, an example of discrimination processing of the second discrimination part 32 will be described.

Specifically, the discrimination processing performed by the second discrimination part 32 calculates an evaluation value (for example, a posterior probability) for each of the candidate categories for classifying the category related to the target object, on the basis of the second feature extraction result X. Subsequently, the second discrimination part 32 corrects the evaluation value so as to reflect the reliability Yc of the first discrimination result Zc (for example, integrate the probability indicated by the reliability) for the candidate categories of the same type of the first discrimination result Zc (representing the same category and lower category of the category of the first discrimination result Zc). The second discrimination part 32 corrects the evaluation value so as to reflect 1-reliability Yc of the first discrimination result Zc (for example, integrate the probability indicated by the 1-reliability Yc) for the candidate categories of the different type. Subsequently, the second discrimination part 32 determines the candidate category having the greatest evaluation value as the category Zout related to the target object.

More preferably, the second discrimination part 32 according to the present embodiment determines the category Zout related to the target object on the basis of the Bayesian discrimination rule as illustrated in the following formula (2).

[Mathematical Expression 2]

$$Zout = \underset{Z}{\operatorname{argmax}} \log p(Z \mid Zc, X) \quad \text{Formula (2-a)}$$

$$= \underset{Z}{\operatorname{argmax}} \left[ \log \frac{p(Zc \mid Z, X)}{p(Zc)} + \log p(Z \mid X) \right] \quad \text{Formula (2-b)}$$

$$= \underset{Z}{\operatorname{argmax}} [\log \gamma + \log p(Z \mid X)] \quad \text{Formula (2-c)}$$

(where, Zout represents the second discrimination result, Z represents the candidate category of the second discrimination part, X represents the second feature extraction result, Zc represents the category of the first discrimination result, p(*) represents probability, and γ represents correction coefficient)

Bayesian discrimination rule is a discrimination model used to express an evaluation value of each of candidate categories as a posterior probability from image features to determine the candidate category with the greatest posterior probability as a discrimination result. Note that the classifier that performs such discrimination processing is provided with a discrimination function to be able to calculate the posterior probability of the candidate category from a certain image feature by undergoing learning processing of associating the image feature with the candidate category beforehand. As such a classifier, for example, a Bayesian classifier are a hidden Markov model classifier are useful.

Formula (2-a) is a calculation formula for determining the category Zout related to the target object of the second discrimination part 32, and used to calculate an evaluation value (=log p (Z|Zc, X)) for each of candidate categories of the target object to determine the candidate category with the greatest evaluation value as the discrimination result. Note that, unlike typical classifiers, the second discrimination part 32 uses the discrimination result Zc of the first discrimination part 22 in addition to the second feature extraction result X to calculate the evaluation value (=log p (Z|Zc, X)) for each of the candidate categories. Formula (2-a) can be transformed into formula (2-b) and formula (2-c) by Bayes' theorem.

The evaluation value for each of the candidate categories to be compared by the second discrimination part 32 can be expressed as a value obtained by adding a log transformed value (=log γ) of a correction coefficient to a log transformed value (=log p (Z|X)) of the posterior probability obtained from the second feature extraction result X, as illustrated in the formula (2-c).

The correction coefficient (=γ) of the formula (2-c) is calculated from the reliability Yc as illustrated in the following formulas (3-a) to (3-d).

[Mathematical Expression 3]

$$\gamma = \frac{p(Zc \mid Z, X)}{p(Zc)} = \frac{p(Zc \mid Z)}{p(Zc)} \quad \text{Formula (3-a)}$$

$$= \frac{p(Zc, Z)}{p(Z)p(Zc)} \quad \text{Formula (3-b)}$$

$$\propto \frac{p(Zc, Z)}{p(Z)} \quad \text{Formula (3-c)}$$

$$\propto p(Zc, Z) \quad \text{Formula (3-d)}$$

$$= \begin{cases} \text{Reliability } Yc \text{: case of same type} \\ \quad \text{of candidate category as } Zc \\ 1\text{-reliability } Yc \text{: case of different type} \\ \quad \text{of candidate category from } Zc \end{cases}$$

Formula (3-a) is formula transformation of excluding the second feature extraction result X irrelevant to determination of the first discrimination result Zc. Formula (3-b) is formula transformation based on Bayes' theorem. Formulas (3-c) and (3-d) are formula transformation based on the assumption that the prior probability p (Zc) is identical to the prior probability p(Z) generated by each of candidate categories Z.

The correction coefficient γ is represented by the joint probability of the first discrimination result Zc and the second discrimination result (candidate category Z of the second discrimination part 32) as illustrated in formula (3-d). Here, since the reliability Yc of the first discrimination result Zc indicates the probability that the first discrimination result Zc is true, it corresponds to the joint probability of the formula (3-d).

In this manner, the evaluation value for each of the candidate categories Z compared by the second discrimination part 32 is a value obtained by adding a log transformed value (=log p (Z|X)) of the posterior probability obtained from the second feature extraction result X to a log transformed value (=log γ) of the reliability Yc for the candidate category Z of the same type as the first discrimination result Zc, while the evaluation value is a value obtained by adding a log transformed value (=log p (Z|X)) of the posterior probability obtained from the second feature extraction result X to a log transformed value (=log γ) of the 1-reliability Yc for the candidate category Z of the type different from the first discrimination result Zc.

The second discrimination part 32 determines the candidate category having the highest evaluation value among the evaluation values for each of the candidate categories Z calculated by the above processing as the category Zout related to the target object.

Note that the above calculation formulas (2) and (3) are an example when the second discrimination part 32 performs the discrimination processing and can be changed in various manners.

EXAMPLES

A specific example of the image processing apparatus 100 according to the present embodiment will be described with reference to FIGS. 3 to 5.

The image processing apparatus 100 according to the present embodiment performs image processing on a moving image generated by the imaging apparatus 200 and discriminates a behavior category (corresponding to a category of a target object) of a person B1 appearing in the image.

Figure 3:
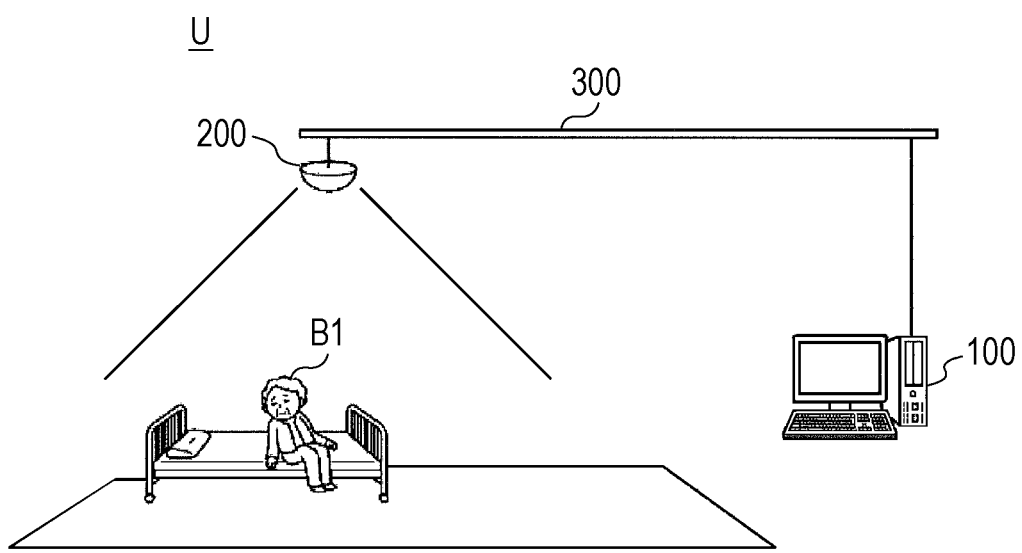
FIG. 3 is a diagram illustrating an exemplary configuration of a behavior recognition system according to an example.

FIG. 3 is a diagram illustrating an exemplary configuration of a behavior recognition system U according to the present example. The behavior recognition system U includes the image processing apparatus 100, the imaging apparatus 200, and the communication network 300, for example. The imaging apparatus 200 is installed at an appropriate position in a room to allow the person B1 to appear in the image. The imaging apparatus 200 transmits moving image data to the image processing apparatus 100 via the communication network 300.

Figure 4A:
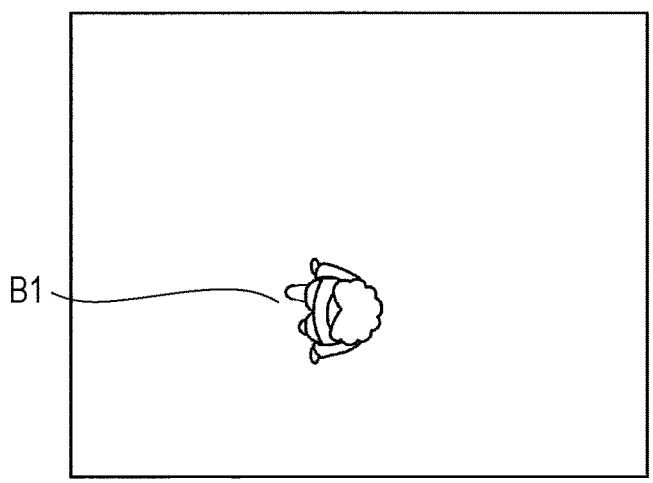
FIGS. 4A to 4C are diagrams illustrating examples of time-series images obtained from an imaging apparatus by an image processing apparatus according to an example.
Figure 4B:
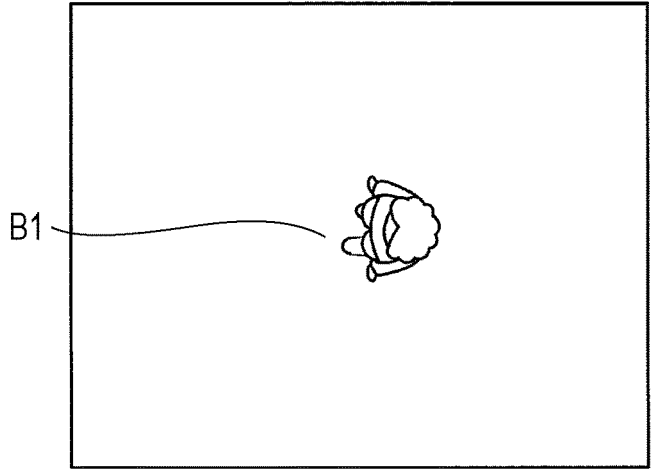
Figure 4C:
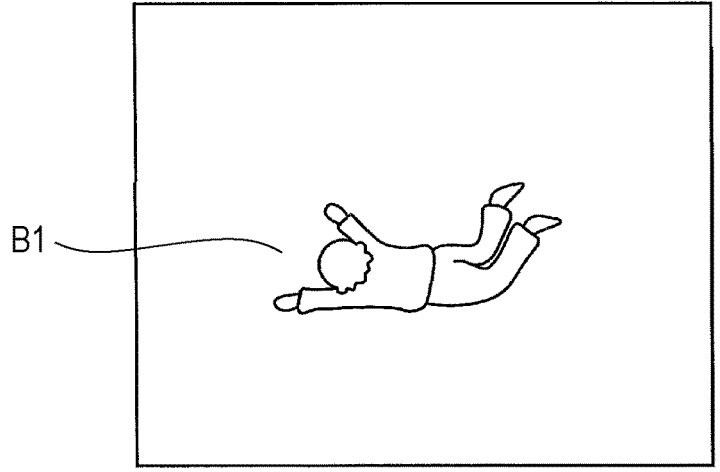

FIGS. 4A to 4C are views illustrating examples of time-series images obtained by the image processing apparatus 100 from the imaging apparatus 200. FIGS. 4A to 4C illustrate images obtained by imaging the person B1 from above. Specifically, FIG. 4A and FIG. 4B illustrate images when the person B1 is walking, and FIG. 4C illustrates an image when the person B1 has fallen over.

Figure 5:
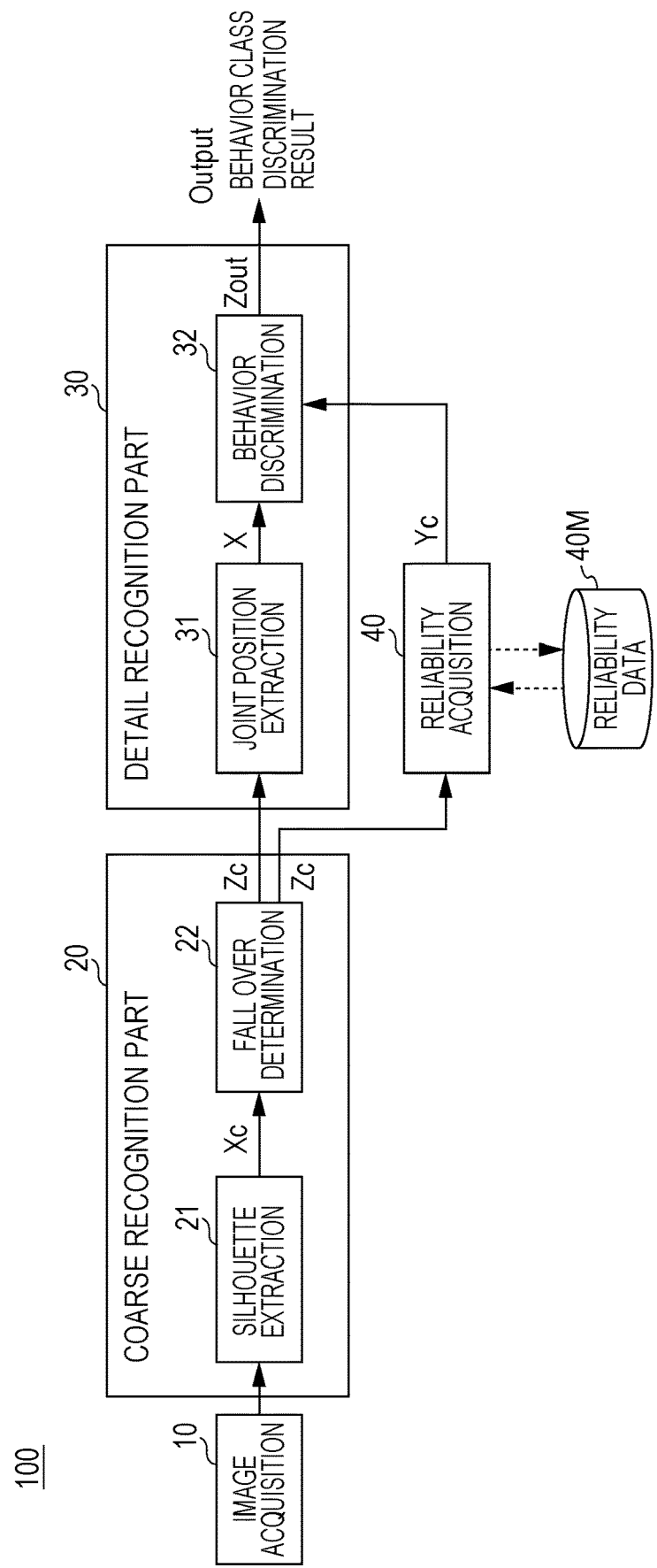
FIG. 5 is a diagram illustrating specific processing executed by individual configurations of an image processing apparatus according to an example.

FIG. 5 is a diagram illustrating specific processing executed by individual configurations of the image processing apparatus 100 according to the present embodiment. Blocks of the individual configurations in FIG. 5 illustrate processing to be executed by the configuration.

The image acquisition part 10 obtains a plurality of pieces of image data continuously generated by the imaging apparatus 200, and sequentially transmits the obtained image data to the first feature extraction part 21.

The first feature extraction part 21 sequentially obtains image data from the image acquisition part 10 and performs silhouette extraction of the person B1 in the image. The first feature extraction part 21 detects luminance gradient at a boundary position of the region of the person B1 in the image using a Sobel filter, a Laplacian filter, for example, so as to extract the silhouette of the person B1 (corresponding to the first feature extraction result Xc).

The first discrimination part 22 performs discrimination processing by known template matching, for example, on the silhouette of the person B1 obtained from the first feature extraction part 21, and discriminates a behavior category (corresponding to the first discrimination result Zc) of whether the person B1 has fallen over. Herein, the first discrimination part 22 has categories of falling over or walking as candidate behavior categories, for example.

The first discrimination part 22 discriminates a state change of the person B1 on the basis of a temporal change in the silhouette of the person B1. The first discrimination part 22 discriminates that the person B1 has fallen over in a case, for example, where the silhouette of the head of the person B1 suddenly changed, as illustrated in FIG. 4C. In such a case, in order to discriminate the behavior category of the person B1 with higher accuracy, the first discrimination part 22 transmits the discrimination result to the detail recognition part 30, and causes the detail recognition part 30 to execute processing.

The reliability acquisition part 40 obtains the reliability Yc of the first discrimination result Zc with reference to the reliability data 40M. The reliability data 40M has settings, for example, such that the reliability is 80% in a case where the first discrimination result Zc indicates falling as the behavior category, and that the reliability is 20% in a case where the first discrimination result Zc indicates walking as the behavior category.

The second feature extraction part 31 obtains data indicating the image region of the person B1 together with the first discrimination result Zc from the first discrimination part 22, and performs processing for extracting the joint position of the person B1 onto the image region of the person B1. The second feature extraction part 31 extracts the joint position (corresponding to the second feature extraction result X) of the person B1, using the learned CNN, for example.

Since the technique of extracting the joint position of the person B1 using the convolutional neural network is similar to the known technique, a detailed explanation thereof will be omitted here (for example, refer to Alexander Toshev, et al. "Deep Pose: Human Pose Estimation via Deep Neural Networks", in CVPR, 2014, ("URL: http://www.cv-foundation.org/openaccess/content_cvpr_2014/papers/Toshev_DeepPose_Human_Pose_2014_CVPR_paper.pdf").

Similarly to the first feature extraction part 21, the second feature extraction part 31 sequentially performs feature extraction on each of a plurality of pieces of image data, and transmits the extracted feature to the second discrimination part 32.

For example, the second discrimination part 32 performs discrimination processing based on the learned hidden Markov model (HMM) on the data related to the temporal change of the joint position of the person B1 obtained from the second feature extraction part 31 so as to discriminate the behavior category (corresponding to the second discrimination result Zout) of the person B1.

Herein, the second discrimination part 32 has candidate categories such as falling over, walking, sitting in a chair, and taking things. Subsequently, on the basis of the first discrimination result Zc, the second discrimination part 32 excludes, for example, obviously unrelated candidate categories, and performs discrimination processing on solely the candidate categories that need more detailed discrimination processing such as falling over or sitting in a chair. Note that the second discrimination part 32 is configured to prepare a model of the HMM for each of the candidate categories so as to calculate the posterior probability of each of the models from time-series data of the joint position of the person B1 at the time of discrimination processing.

The second discrimination part 32 calculates an evaluation value for each of the candidate categories on the basis of the temporal change in the joint position of the person B1, for example. Subsequently, as described above with reference to the formulas (2) and (3), or the like, the second discrimination part 32 calculates the correction coefficient γ for each of candidate behavior categories, so as to correct the evaluation value for each of the candidate behavior categories. At this time, the second discrimination part 32 sets the reliability (herein, 70%) for the correction coefficient γ of the candidate category (in this case, falling over) of the same type as that of the first discrimination part 22 as illustrated in formula (2-d) to correct the evaluation value, and sets the 1-reliability (herein, 30%) for the correction coefficient γ for categories such as sitting in a chair other than falling over, so as to correct the evaluation value.

The second discrimination part 32 outputs, as the second discrimination result, the behavior category having the greatest evaluation value among the evaluation values for each of the candidate behavior categories.

Since the technique of discriminating categories using the HMM is similar to the known technique, the detailed explanation here will be omitted (for example, refer to Donald O. Tanguay, Jr. et al. "Hidden Markov Model for Gesture Recognition", Carnegie Mellon University, Technique Report, 1994, ("URL: https://pdfs.semanticscholar.org/c66a/6ae713efb2730e28d0907190ffeeb77e883f7.pdf")).

As described above, the image processing apparatus 100 according to the present embodiment divides a recognition phase into a plurality of stages, narrows down the feature extraction target, the candidate categories, or the like in stages, while discriminating the category Z related to the target object using the discrimination result Zc of the recognition phase of the preceding stage (herein, coarse recognition part 20) at the recognition phase of the succeeding stage (herein, the detail recognition part 30). This makes it possible to achieve highly accurate discrimination performance.

Moreover, with the image processing apparatus 100 according to the present embodiment, even in a case where there is a gap between the discrimination result and the user's perception, the final discrimination result (second discrimination result Zout) can be adjusted by the user by adjusting the reliability data 40M, enabling optimization as the entire recognition system.

<First Modification>

Figure 6:
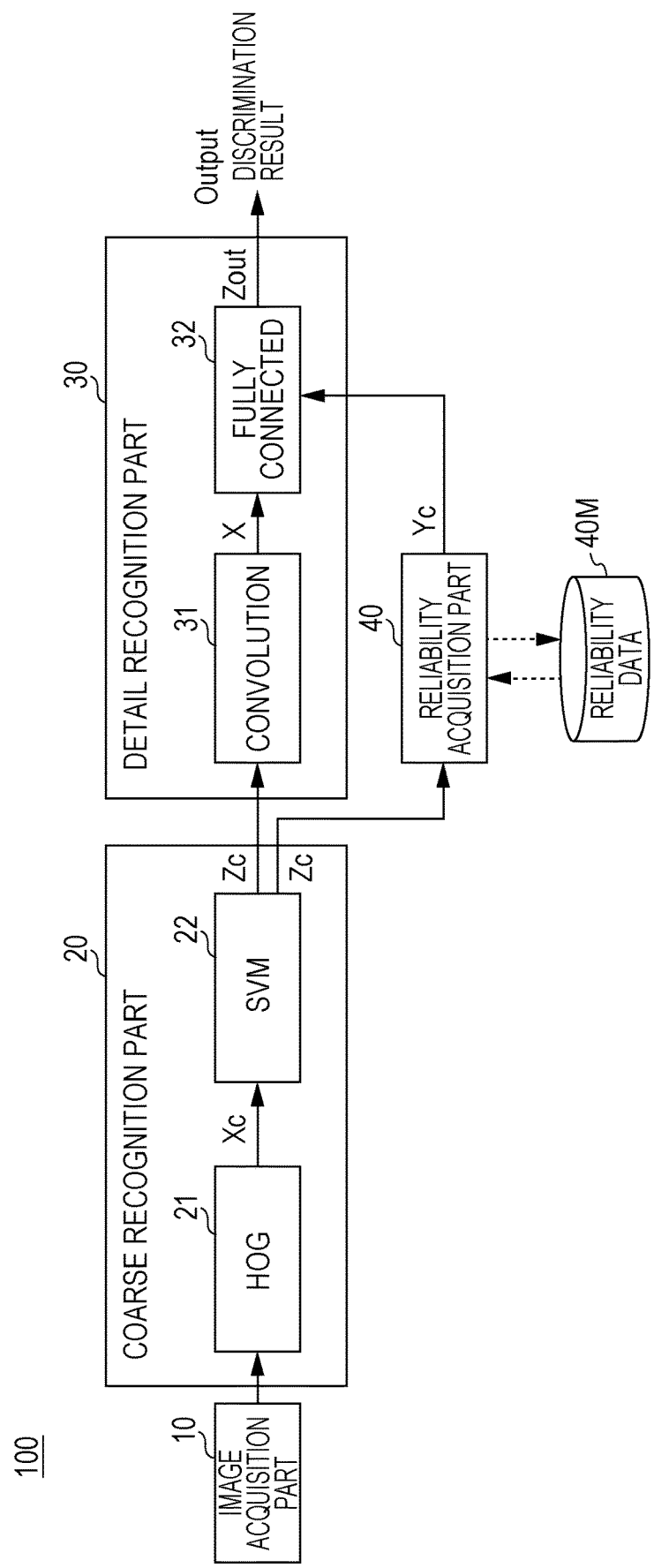
FIG. 6 is a diagram illustrating an exemplary configuration of an image processing apparatus according to a first modification.

FIG. 6 is a diagram illustrating specific processing executed by individual configurations of the image processing apparatus 100 according to a first modification.

The image processing apparatus 100 according to the first modification is different from the above-described embodiment in processing executed by the coarse recognition part 20 and the detail recognition part 30.

In the image processing apparatus 100 according to the first modification, the first feature extraction part 21 is configured with a Histograms of Oriented Gradients (HOG) feature amount extraction part, while the first discrimination part 22 is configured with a learned Support Vector Machines (SVM) classifier.

In the image processing apparatus 100 according to the first modification, the second feature extraction part 31 is configured with a learned convolutional neural network, while the second discrimination part 32 is configured with learned multilayer perceptron fully connected with the output of the convolutional neural network.

Even with such a configuration, it is also possible to obtain the effects similar to the case of the above embodiment.

<Second Modification>

FIG. 7 is a diagram illustrating a configuration of the image processing apparatus 100 according to a second modification.

The image processing apparatus 100 according to the second modification is different from the above embodiment in that it includes a second detail recognition part 50 and a second reliability acquisition part 60.

Similarly to the detail recognition part 30, the second detail recognition part 50 (corresponding to a "third recognition part" of the present invention) is configured with a combination of a feature extraction part and a discrimination part (not illustrated). In addition, the second detail recognition part 50 is configured to execute discrimination processing according to the discrimination result of the detail recognition part 30. In other words, the second detail recognition part 50 further narrows down the candidate categories on the basis of the discrimination result of the detail recognition part 30, so as to execute category discrimination processing of the target object.

Similarly to the reliability acquisition part 40, the second reliability acquisition part 60 refers to reliability data 60M of the discrimination result stored in association with each of candidate categories classified by the detail recognition part 30. Subsequently, the second reliability acquisition part 60 obtains reliability of the discrimination result of the detail recognition part 30 from the reliability data 60M, and transmits the obtained reliability to the second detail recognition part 50.

Although not illustrated in FIG. 7, a recognition part having a similar configuration may be further provided at a succeeding stage of the second detail recognition part 50.

In this manner, the recognition phases are divided into multiple stages, and the reliability of the recognition phase of the preceding stage is referred to in each of the recognition phases, so as to achieve more highly accurate discrimination performance.

<Third Modification>

While the example illustrated in FIG. 5 illustrates a mode in which the candidate categories classified by the coarse recognition part 20 are two categories, it is a matter of course that the candidate categories can be applied to three or more categories.

At that time, it is preferable to calculate and store the reliability of the discrimination result for each of the candidate categories classified by the coarse recognition part 20 as the reliability data 40M beforehand. This enables the detail recognition part 30 to discriminate the category Z related to the target object by using the discrimination result of the coarse recognition part 20 in consideration of the reliability, similarly to the above examples.

[Other Embodiments]

The present invention is not limited to the above embodiment, and various modifications are conceivable.

The above embodiment describes, as an example of the configuration of the image processing apparatus 100, a case where the functions of the image acquisition part 10, the coarse recognition part 20, the detail recognition part 30, and the reliability acquisition part 40 are implemented by one computer. Alternatively, however, this may be implemented by a plurality of computers as a matter of course. In addition, programs and data read out to the computer may also be distributed and stored in a plurality of computers.

Note that while the above embodiment does not include flows of processing by the image acquisition part 10, the coarse recognition part 20, the detail recognition part 30, or the reliability acquisition part 40 as exemplary operation of the image processing apparatus 100, the procedures of the processing of the above may be implemented in any manner, and it is a matter of course that some or all of the procedures may be executed in series or may be executed in parallel.

According to the image processing apparatus of the present disclosure, it is possible to perform image recognition with higher accuracy.

Although embodiments of the present invention have been described and illustrated in detail, the disclosed embodiments are made for purposes of illustration and example only and not limitation. The scope of the present invention should be interpreted by terms of the appended claims. Technologies described in the claims include specific examples above that have been modified and altered in various manners.

What is claimed is:

1. An image processing apparatus comprising:
    an image acquisition part that obtains an image including a captured target object;
    a first recognition part that extracts a feature related to the target object in the image and discriminates a category related to the target object on the basis of a result of the feature extraction;
    a reliability acquisition part that obtains reliability of a discrimination result of the first recognition part with reference to data indicating reliability of the discrimination result stored in association with a candidate category classified by the first recognition part;
a second recognition part that executes discrimination processing in accordance with the discrimination result of the first recognition part, extracts a feature related to the target object in the image, and discriminates the category related to the target object on the basis of the result of the feature extraction and the reliability of the discrimination result of the first recognition part,
wherein the first recognition part includes:
a first feature extraction part that extracts a feature vector related to the target object in the image; and
a first discrimination part that discriminates the category related to the target object on the basis of a result of feature extraction by the first feature extraction part, and
the second recognition part includes:
a second feature extraction part that extracts a feature vector related to the target object in the image; and
a second discrimination part that discriminates the category related to the target object on the basis of the result of feature extraction by the second feature extraction part and reliability of the discrimination result of the first recognition part,
wherein the second discrimination part
calculates an evaluation value for each of candidate categories for classifying the category related to the target object as posterior probability obtained from the result of feature extraction by the second feature extraction part,
corrects the evaluation value on the basis of the reliability of the discrimination result of the first recognition part, and
determines the discrimination result of the category related to the target object on the basis of the evaluation value.

2. The image processing apparatus according to claim 1, wherein the second recognition part selects a candidate category for discriminating the category related to the target object on the basis of the discrimination result of the first recognition part, and executes discrimination processing suitable for judgment of propriety of the candidate category.

3. The image processing apparatus according to claim 1, wherein the image acquisition part obtains a plurality of continuously generated images,
the first recognition part discriminates the category related to the target object on the basis of a temporal change in a result of feature extraction performed on each of the plurality of images, and
the second recognition part discriminates the category related to the target object on the basis of the temporal change in the result of feature extraction performed on each of the plurality of images and the reliability of the discrimination result of the first recognition part.

4. The image processing apparatus according to claim 3, wherein the category related to the target object is a behavior category related to the target object.

5. An image processing apparatus comprising:
an image acquisition part that obtains an image including a captured target object;
a first recognition part that extracts a feature related to the target object in the image and discriminates a category related to the target object on the basis of a result of the feature extraction;
a reliability acquisition part that obtains reliability of a discrimination result of the first recognition part with reference to data indicating reliability of the discrimination result stored in association with a candidate category classified by the first recognition part;
a second recognition part that executes discrimination processing in accordance with the discrimination result of the first recognition part, extracts a feature related to the target object in the image, and discriminates the category related to the target object on the basis of the result of the feature extraction and the reliability of the discrimination result of the first recognition part;
a second reliability acquisition part that obtains reliability of the discrimination result of the second recognition part with reference to data indicating the reliability of the discrimination result stored in association with the candidate category classified by the second recognition part; and
a third recognition part that first determines a processing mode on the basis of the discrimination result of the second recognition part, then executes the feature extraction processing of the image according to the discrimination result of the second recognition part in the processing mode, and discriminates the category related to the target object on the basis of the result of the feature extraction and the reliability of the discrimination result of the second recognition part.

6. An image processing method comprising:
obtaining an image including a captured target object;
extracting a feature related to the target object in the image and discriminating a category related to the target object on the basis of a result of the feature extraction;
obtaining reliability of a discrimination result of the discrimination processing with reference to data indicating reliability of the discrimination result stored in association with a candidate category classified by the discrimination processing;
extracting a feature related to the target object in the image so as to execute processing according to the discrimination result of the discrimination processing, and discriminating the category related to the target object on the basis of the result of the feature extraction and the reliability of the discrimination result of the discrimination processing;
obtaining reliability of the discrimination result with reference to data indicating the reliability of the discrimination result stored in association with the candidate category classified by the discrimination processing; and
determining a processing mode on the basis of the discrimination result of the discrimination processing, then executing the feature extraction processing of the image according to the discrimination result of the discrimination processing in the processing mode, and discriminating the category related to the target object on the basis of the result of the feature extraction processing and the obtained reliability of the discrimination result.

7. A non-transitory recording medium storing a computer readable image processing program that causes a computer to execute:
obtaining an image including a captured target object;
extracting a feature related to the target object in the image and discriminating a category related to the target object on the basis of a result of the feature extraction;
obtaining reliability of a discrimination result of the discrimination processing with reference to data indicating reliability of the discrimination result stored in association with a candidate category classified by the discrimination processing;

extracting a feature related to the target object in the image so as to execute processing according to the discrimination result of the discrimination processing, and discriminating the category related to the target object on the basis of the result of the feature extraction and the reliability of the discrimination result of the discrimination processing;

obtaining reliability of the discrimination result with reference to data indicating the reliability of the discrimination result stored in association with the candidate category classified by the discrimination processing; and determining a processing mode on the basis of the discrimination result of the discrimination processing, then executing the feature extraction processing of the image according to the discrimination result of the discrimination processing in the processing mode, and discriminating the category related to the target object on the basis of the result of the feature extraction processing and the obtained reliability of the discrimination result.

* * * * *